United States Patent [19]

Anthony

[11] 4,178,632

[45] Dec. 11, 1979

[54] METHOD FOR CONTROLLING THE OPERATION OF A COMPUTER OPERATED ROBOT ARM

[75] Inventor: Donald W. Anthony, Cincinnati, Ohio

[73] Assignee: Cincinnati Milacron Inc., Cincinnati, Ohio

[21] Appl. No.: 883,472

[22] Filed: Mar. 6, 1978

[51] Int. Cl.² .................. G06F 15/46; G05B 19/10; B25J 9/00

[52] U.S. Cl. .................. 364/513; 318/568; 364/107; 364/478; 414/4

[58] Field of Search ............ 364/474, 107, 513, 571, 364/300; 318/568, 572; 214/1 CM

[56] References Cited

U.S. PATENT DOCUMENTS

| | | | |
|---|---|---|---|
| 3,850,313 | 11/1974 | Rackman et al. | 214/1 CM |
| 3,909,600 | 9/1975 | Hohn | 364/513 |
| 3,920,972 | 11/1975 | Corwin, Jr. et al. | 364/513 X |
| 3,943,343 | 3/1976 | Irie | 364/513 X |
| 4,025,838 | 5/1977 | Watanabe | 318/568 |

*Primary Examiner*—Joseph F. Ruggiero
*Attorney, Agent, or Firm*—C. Richard Eby

[57] ABSTRACT

The invention relates to a computer operated robot arm in which the operation of the robot arm is controlled by a first program defining absolute coordinate values of points necessary for a basic cycle of operation and at least one second program defining absolute coordinate values of points necessary for a conditional cycle of operation. After being initially defined a single time during a teaching mode of operation, the invention allows the second program to be recalled many times during the execution of the first program by merely utilizing an address code. Consequently, even though the second program is defined by absolute coordinate data, the second program may be used to control the robot arm at any spatial location.

8 Claims, 5 Drawing Figures

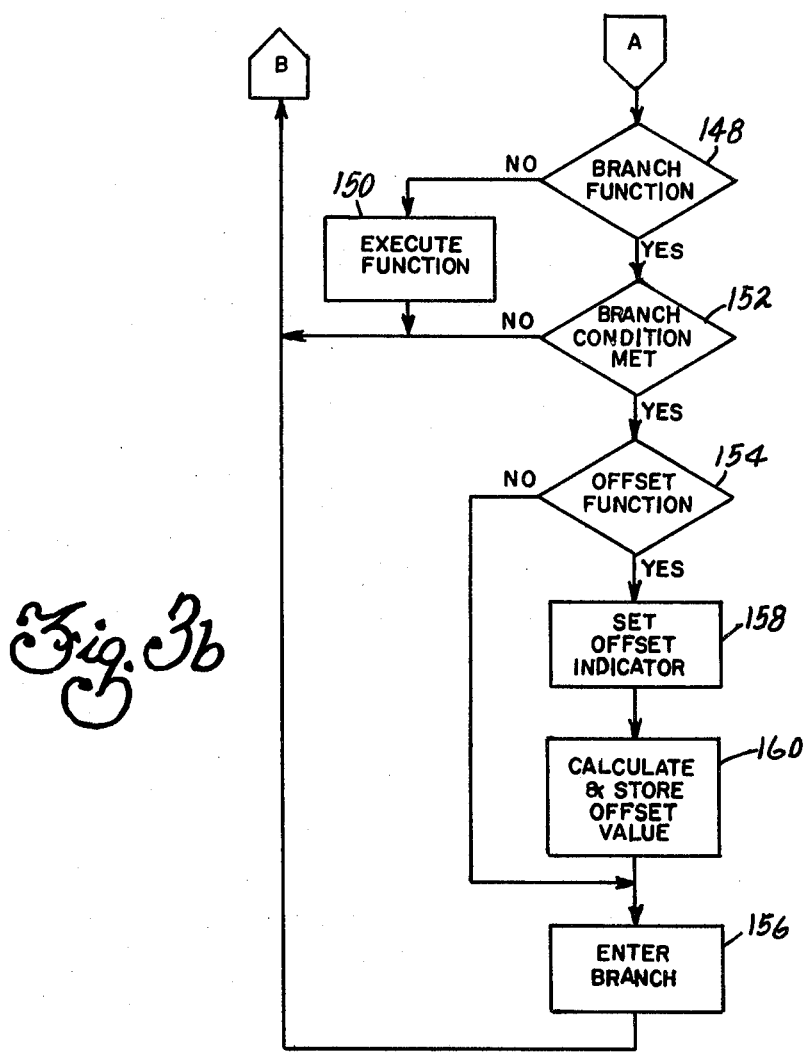

METHOD FOR CONTROLLING THE OPERATION OF A COMPUTER OPERATED ROBOT ARM

BACKGROUND OF THE INVENTION

The invention relates generally to the area of computer controlled robot arms; and specifically, the invention provides a method for utilizing a program defining absolute positions at various spatial locations. Traditional robot controls have utilized several techniques to expand the control capabilities.

First, U.S. Pat. No. 3,543,947 discloses a basic programmable robot control containing a program defining the absolute positions of the robot arm. During the execution of the program, a transducer connected to one of the axes of motion is utilized on a real time basis to modify the absolute position of another axis of motion. A similar system is shown by U.S. Pat. No. 2,861,699 which illustrates a manually controlled robot arm.

Another, more sophisticated, real time modification system is illustrated by U.S. Pat. No. 3,850,313 which discloses a program controlled robot arm having a caliper for measuring the dimensions of box-like workpieces. During a teaching mode of operation, a cycle is programmed for moving a workpiece from a fixed location to a first position on a pallet and back to the fixed location. The dimensions of a second workpiece are measured and added to the axial positions defining the location of the first workpiece. The robot arm positions the second workpiece on the pallet utilizing the programmed cycle and the dimensional information of the second workpiece which has been derived by the caliper.

Further, the signals generated which define the location of the first, second and subsequent workpieces may be recorded for subsequent use, e.g. to unload the pallet. The system further limits the number of workpieces which are loaded in each row in the pallet, defines the number of rows and changes the direction of the rows by 90° at alternate levels.

U.S. Pat. No. 3,306,442 illustrates a multiple program system. After executing a first program defining a basic cycle, one of several second programs is chosen in response to an external stimulus. The second program causes the robot arm to operate directly in accordance with its programmed absolute positions, and hence the programmed coordinates are not in any way modified.

A variation of the above scheme is illustrated in U.S. Pat. No. 3,306,471 in which position control of the robot arm is shifted between programs in response to preprogrammed codes. Again the programs operate independently and do not in any way change from their programmed characteristics.

The prior art illustrates the continuing need for a program control which is easily defined and flexible in its execution.

In many applications, it is desirable to repeat a pattern of motions at various locations in space. FIG. 4 illustrates an elementary example in which it is desired to wrap wire around the illustrated pegs 166 through 176. If the architecture of the robot control permits, the task may be divided into a number of separate programs. Without this architecture, it would necessary to program each and every point required in the wrapping process. With typical multiple program architectures, a first program is generated which represents the basic cycle. In FIG. 4, such a first program is illustrated by the circle symbols and the labels M001 through $M_n$. Next, each deviation from the first program is defined by a number of second programs which define a wrapping action around each set of pegs. Each second program has a number of points represented by the + symbol. This architecture proves satisfactory where each second program defines a separate and unique wrapping pattern. However, in the example illustrated in FIG. 4, each wrapping pattern is identical. Therefore, the most efficient mode of operation would require that the pattern be defined only one time. The present invention allows such a utilization. With the present invention, a first program defines the general cycle, and a second program defines the repetitive specific wrapping pattern relative to two of the pegs, e.g. pegs 166 and 168. Even though the points 0A01 through 0A04 in the second program are defined in terms of absolute spatial coordinates, the disclosed system allows the program to originate from any point in the first program and be executed at different spatial locations.

In view of the above, it can be seen how the invention varies from the prior art cited. First, the invention does not provide the real time modification of a program from an external source. Second, it differs from other multiple program systems in that the control of the spatial location of the robot arm is not limited by the absolute nature of the programmed positions.

SUMMARY OF THE INVENTION

According to one embodiment of the invention, applicant claims a method for controlling a robot arm in response to sets of command signals stored in a memory. The command signals represent programmed functions and absolute coordinate values relative to a first coordinate system of spacial positions of a robot arm. The sets of command signals are divided into multiple programs. A first set of command signals represents a first program defining a basic cycle of operation of the robot arm, and a second set of command signals represents a second program defining a conditional operation of the robot arm in response to a request signal. The sets of command signals are defined during a teaching mode of operation and are utilized during an automatic mode of operation. The claimed invention is comprised of a number of steps to execute the following process. During the teaching mode of operation, the first and second programs are defined and one of the second programs is identified as an offset program. Further, the offset program is addressed from at least two different points in the first program. During the automatic mode, the process continues by recalling from the memory the first sets of command signals defining the first program. After each first set of signals is read from memory, the robot arm is moved to a spatial position defined by the absolute coordinate values of said first set of signals. After the robot arm is in position, the first set of signals is tested to see whether or not a second program is addressed. If the second program has been addressed, the process tests for conditions which require the execution of the second program. If these conditions exist, the second program is tested to see whether it represents an offset program. If it does represent an offset program, offset values are calculated and stored using the present position of the robot arm and the first position defined in the offset program. Next, each point in the offset program is modified by adding the offset values thereto, and the robot arm is moved to a spatial position defined by the modified offset values.

BRIEF DESCRIPTION OF THE DRAWINGS

FIGS. 3a and 3b illustrate a detailed flow chart of a routine for utilizing the disclosed invention of permitting a program defining spatial positions in absolute coordinate values to be executed at different points in space.

FIG. 4 illustrates an elementary example of a wire wrapping application for utilizing the disclosed invention.

DESCRIPTION OF THE PREFERRED EMBODIMENT

Figure 1:
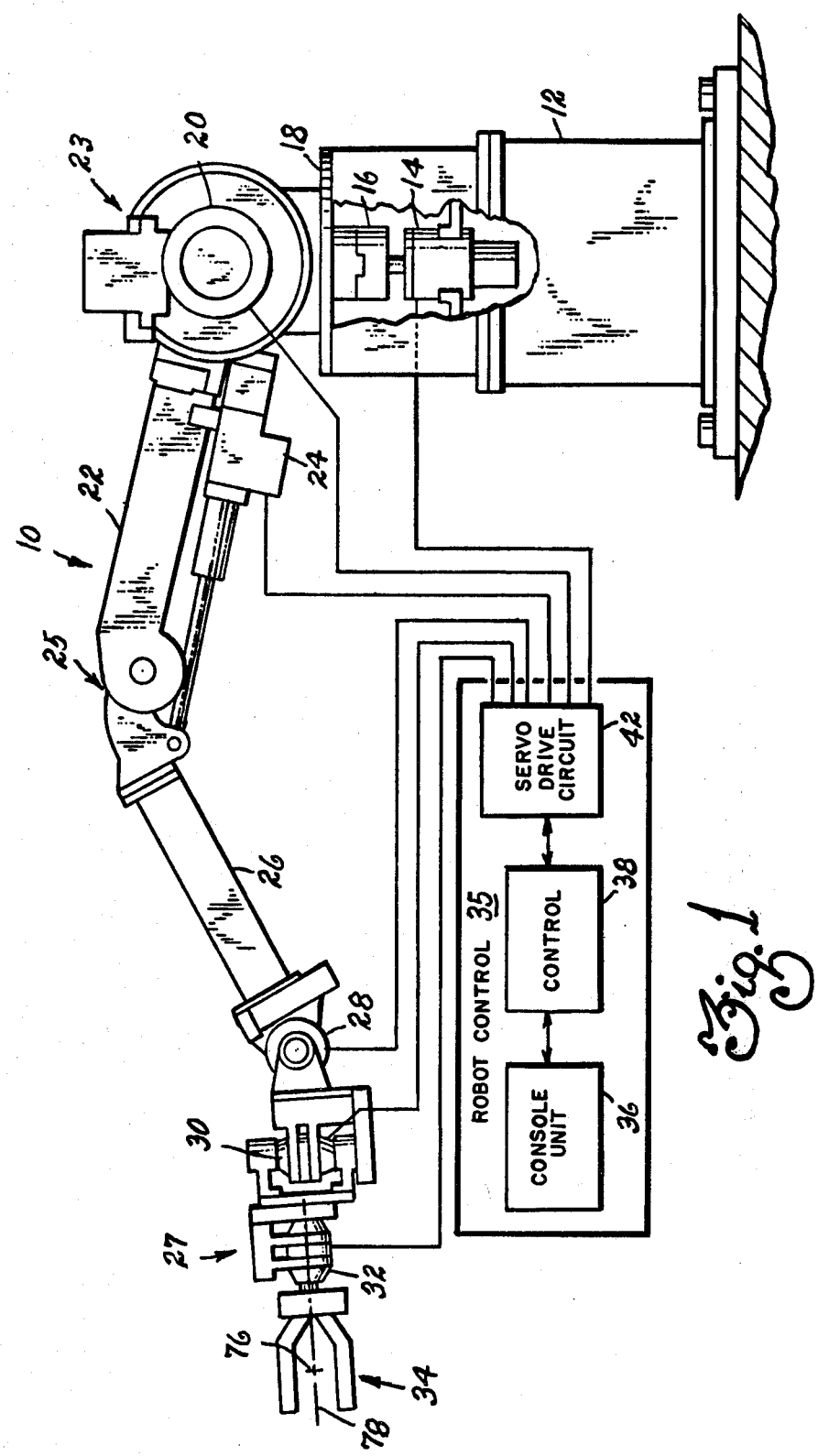
FIG. 1 is an overall view of a robot arm and illustrates its general relationship to a robot control system.

FIG. 1 is a general configuration of a commercially available robot arm and FIG. 1 further includes a general block diagram of a robot control for said robot arm. The detailed structure of the robot arm is not important to the present application. Further, as used herein the term robot arm encompasses any machine which may be subject to the claimed invention.

The illustrated robot arm 10 is comprised exclusively of axes of rotary motion. A base 12 contains an actuator 14 which is connected by means of a coupling 16 to a rotatably mounted plate 18. It should be noted that the exact nature of the actuator 14 is not significant to this disclosure. Prior art method of actuator control whether the actuator is electric, hydraulic, pneumatic, etc., are applicable. Rigidly fixed on the plate 18 is an actuator 20 providing a second axis of rotation. An upper arm 22 is attached to a working member of the actuator 20. Fixed to the upper arm 22 is an actuator 24, which provides a rotation of a lower arm element 26 about the upper arm element 22. The actuators 14, 20 and 24 are sufficient to move the end of the robot arm to any point in space within its range. A hand 27 is comprised of rotary actuators 28, 30 and 32 and a function element 34. Many types of tooling may comprise the function element 34.

A predetermined path is defined by the robot arm moving a work point of the function element through space in response to a program. The exact location of the work point will be a function of the tooling used. For example, the work point may be the point at which gripping tongs come together, e.g. point 76, a center point of a cutting tool, the point at which welding heads come together or the center of the fan of the spray from a spray gun, etc. Practically speaking, the work point represents the end of the robot arm. Therefore, in the specification and the appended claims, any reference to the end of the robot arm shall be construed as meaning the work point of the function element. It should be noted that the function element 34 has a small actuator (not shown) for generating the desired function, e.g., a gripping action.

Within a robot control 35, console unit 36 is provided as a communication link to the robot arm. The console includes general control functions and input devices for generating input signals to enable a predetermined cycle of operation. The console unit includes controls for programming or teaching the robot arm a cycle of operation. A control 38 utilizes programs and input signals to generate a predetermined path therefrom and produces control signals to a servomechanism drive circuit 42. The drive circuit 42 commands the actuators on the robot arm to move the function element along the predetermined path.

A robot arm and control as described herein corresponds to the T$^3$ industrial robot and control commercially available from Cincinnati Milacron Inc. Further, the detailed operation of the robot arm in its automatic mode of control is described in U.S. Pat. No. 3,909,600, and a description of the method and apparatus utilized for teaching the robot arm a program is described in the U.S. Pat. No. 3,920,972.

Figure 2:
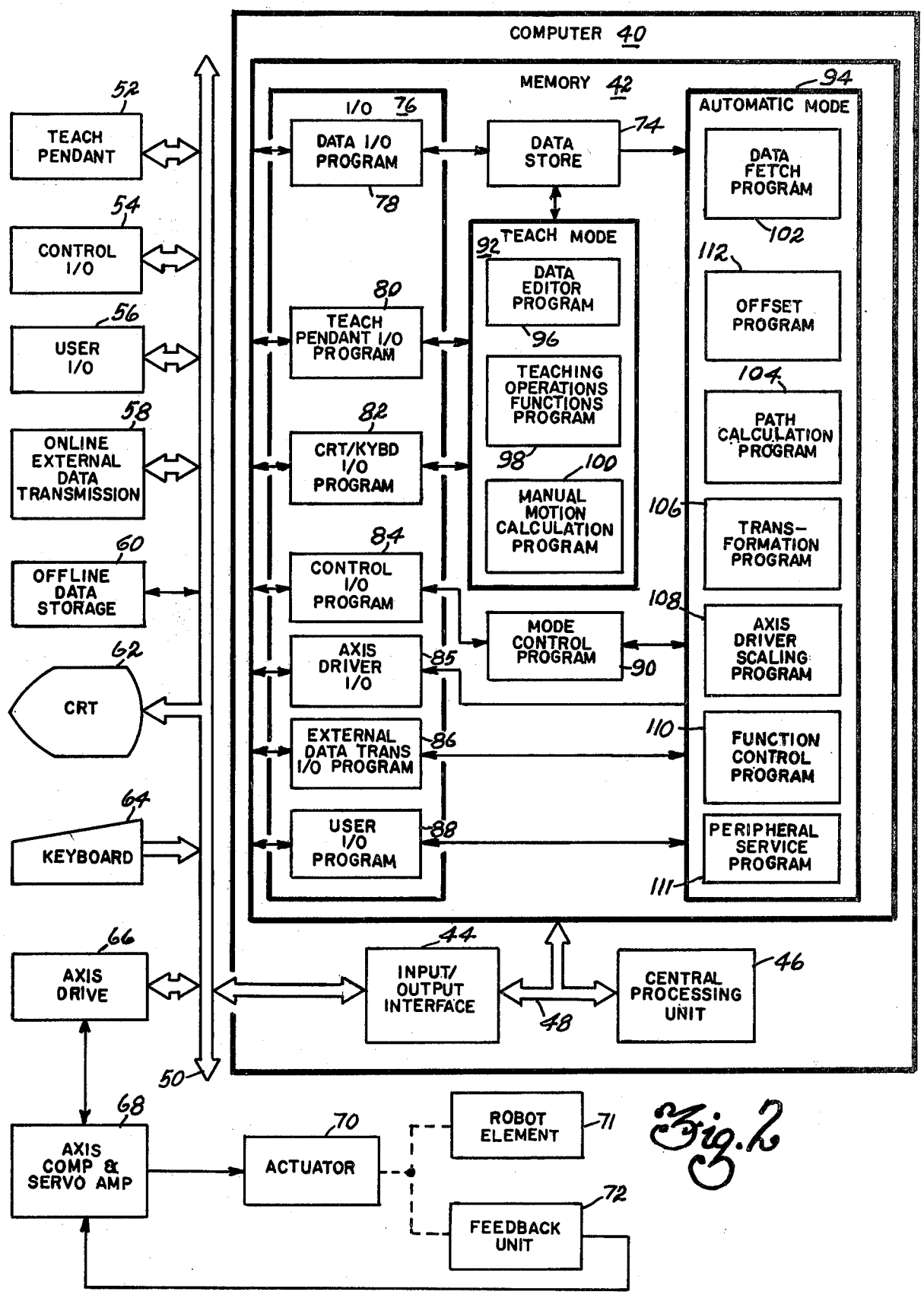
FIG. 2 is a detailed block diagram of a control system for controlling the operation of the robot arm and illustrates the general environment for utilizing the invention.

FIG. 2 is a detailed block diagram illustrating the basic components of the commercially available robot control referenced above. A programmed computer 40 is comprised of a memory unit 42, input and output interface circuits 44 and a central processing unit 46. These three main elements are interconnected by an internal bus 48. Control signals are passed to and from the computer 40 by means of an external bus 50 which is connected to a number of peripheral devices.

First, a teach pendant 52 is a remote programming tool utilized by the operator to move the end of the robot arm to a number of desired positions during the teaching process. Next, control I/O 54 defines a number of miscellaneous machine control signals which are necessary for the operation of the robot arm. The user I/O 56 defines the machine or process signals which are generated by the user of the robot arm to allow the robot arm to cooperate with the operation of a machine or the execution of a process. The online external data transmission block 58 represents a device which allows data to be entered into the computer 40 from an external data store on a real time basis, i.e. while the robot arm is executing a cycle of operation. An offline data storage unit 60 is provided for allowing programs to be input to the computer by means of such devices as a punched tape reader, cassette reader, etc. The CRT 62 and keyboard 64 provide means by which the robot arm and its control are able to communicate messages to the operator as well as allow the operator to generate signals back to the robot arm.

The axis drive unit 66 accepts blocks of data from the computer on a periodic basis. Each block of data represents the magnitude of the motion of the robot arm during each periodic interval. Further, the magnitude of motion over each fixed period inherently provides a definition of the desired velocity of the robot arm. The axis drive 66 accepts the data in digital form and executes a digital to analogue conversion thereby providing an analogue signal to the axis compensation and servo amplifier 68. The compensated analogue signals are then used as an input to an actuator 70 which drives the robot element 71 mechanically attached thereto. A feedback device 72 is mechanically connected to the actuator and provides a feedback signal representing the actual motion of the driven element of the robot arm. It should be noted that although there are several configurations for control of the servomechanism loop for each element of the robot arm, in the preferred embodiment, the axis drive 66, servo amp 68, actuator 70, feedback element 72 are utilized in numbers equal to the number of controlled axes on the robot arm.

The memory 42 within the computer 40 is comprised of two basic components. The first being the data store 74 which stores all numerical data information, and the remainder of the memory is defined as the operating system of the robot arm. The operating system may be characterized as a control program which defines how data is to be generated and utilized during the operation of the robot arm.

The first section of the operating system is an I/O section 76. The I/O programs include a data I/O program 78, a teach pendant I/O program 80, a CRT and keyboard I/O program 82, a control I/O program 84, an axis driver I/O program 85, an external data transmission I/O program 86 and a user I/O program 88. It will be noted that there is an I/O program corresponding to each different type of peripheral being interfaced into the control system. Each I/O program is uniquely responsive to the data produced by each peripheral device and is effective to control the flow of signals from the peripheral devices into and out of the computer.

The operating system also contains a mode control program 90 which exercises overall control over the operating system. The mode control program 90 switches control of the computer between the various operating modes, e.g. manual, teach, automatic, tracking, etc. However, since only the teach and automatic modes are required for the disclosed invention, only these two modes are illustrated in FIG. 2. Within the teach mode system 92 is contained a data editor program 96, a teaching operation and function program 98, and a manual motion calculation program 100. These three programs control the operation of the robot arm during the teach mode, and the specifics of these programs are either described in U.S. Pat. No. 3,920,972 or are available from Cincinnati Milacron Inc.

The automatic mode system 94 is comprised of a data fetch program 102, a path calculation program 104, a transformation program 106, an axis driver program 108, a function control program 110 and a peripheral service program 111. The details of these programs are either specifically described in U.S. Pat. No. 3,909,600 or are available from Cincinnati Milacron Inc. The automatic mode system 94 also contains an offset program 112 which is the subject matter of the presently claimed invention.

Before discussing the offset program, some general comments must be made relative to the basic programming architecture of the robot control. The programming operation is defined by two general types of programs. The first general program is called a mainline program. By definition, the mainline program controls all operations except those specified by the second general program type which is referred to as a branch program. The branch program represents a decision point within a program (mainline or branch) which is conditional upon the current physical state of the machine or process with which the robot arm is operating. In other words, the branch program represents an operational loop which integrates the operation of the robot arm into a portion of the physical process or machine operation. The branch program may or may not be executed depending on the state of a condition or request signal originating from the machine or process. Further, in contrast to the mainline program which may only close on itself, there is no limitation on the closing of a branch program, i.e. it may close on the mainline program or any branch program including itself. A branch program closing on itself is referred to as a subroutine. The distinction between the mainline and branch programs should be generally understood in order to appreciate the value of the offset program.

During the teaching operation, the operator will move the robot arm to a number of predetermined points defining the very basic cycle of operation of the robot arm. At each point, a set of command signals comprised of a function code and the absolute coordinate values relative to a first coordinate system of the point are stored. The function information may define the execution of some operation—e.g. the exercise of the tool on the end of the robot arm—the testing of some external condition, or the identification of a branch program in addition to the testing of a request signal associated therewith. Therefore, as the operator programs the mainline program, he identifies the first level of branch programs. After the operator completes the programming of the mainline program, he may then program the various branch programs.

One final function that should be defined at this point is the technique for ending a program whether it be a mainline or branch program. In the teach mode, after the operator programs the last point in the program, the next point is defined as a close path point. The close path point includes a close path function and an identification of a previously programmed point on which the program is to close thereby generating an operational loop and an iterative cycle of the robot arm.

From the above, it should be apparent that because each of the programs defines positions of the robot arm in terms of absolute coordinate values, once the robot arm is aligned to the control, each program represents a unique spatial path. Consequently, anytime a different path in space is required, new absolute coordinate values are necessary and therefore a new program must be defined. However, as discussed earlier with reference to FIG. 4, there are many operating situations in which a path is to be identically repeated at different physical locations in space. With the prior art apparatus it was necessary to program separate points for each repetition of the path. However, the claimed invention permits the path to be programmed in absolute coordinate values defining a fixed spatial position and subsequently moved to any spatial location by utilizing a single function code, i.e. the offset code. The offset code is entered into the system during the teaching mode of operation when the close path point is being defined and is recognized and executed during the automatic mode of operation.

Figure 3A:
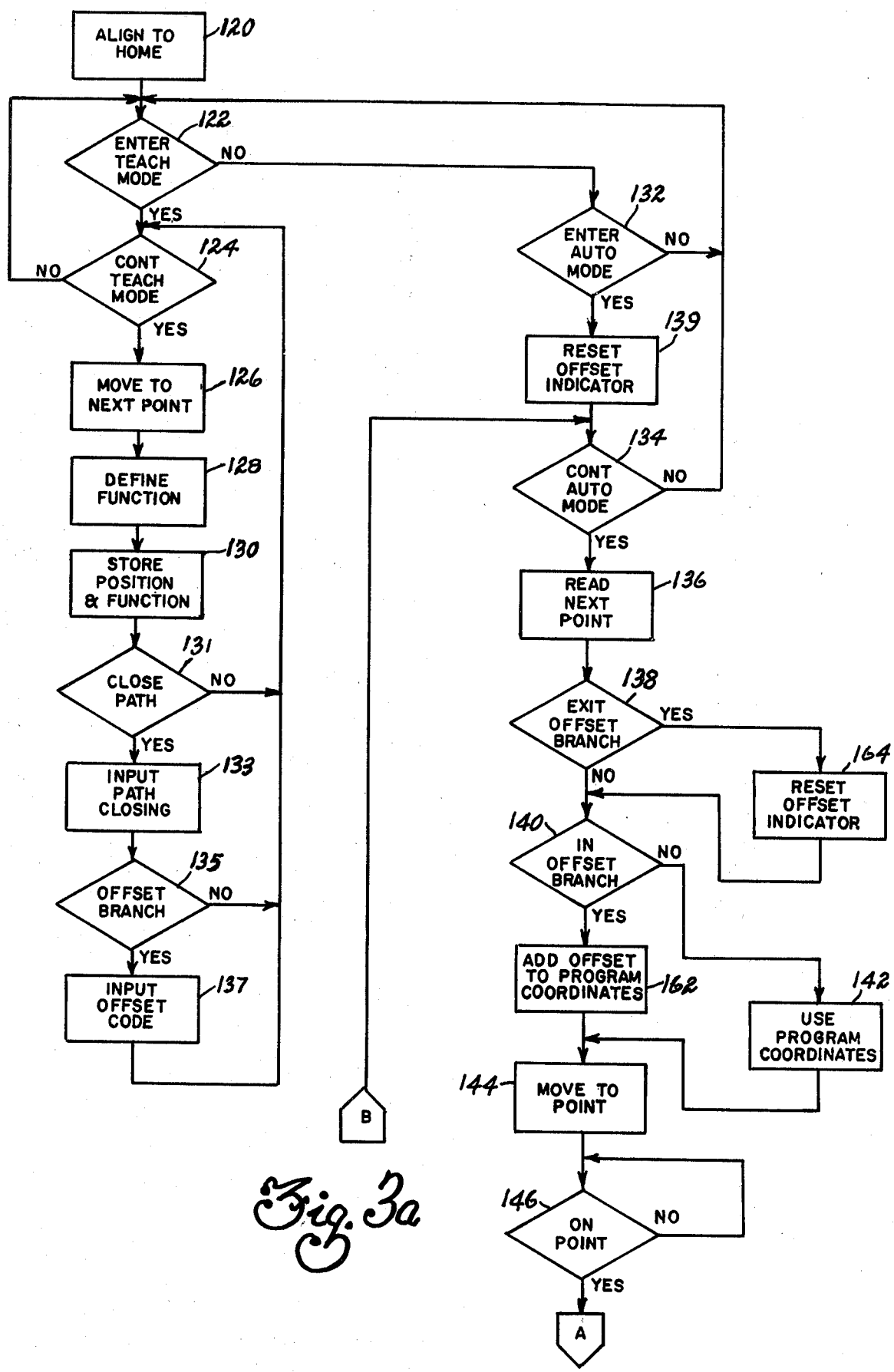

FIGS. 3a and 3b illustrate a flow chart illustrating the basic operation of the robot control system with the addition of the offset program. The very first step in operating the robot arm is to bring it to its home or alignment position. This operation is defined in block 120. The home position operates to physically align the control and robot arm in absolute space. Assume for purposes of explanation, it is desired to teach a program to execute the operation illustrated in FIG. 4. To do this the operator would select the teach mode. Decision block 122 detects the selection of the teach mode and causes the program to move on to block 124 which determines whether or not the program is to continue in the teach mode. The system then moves on to block 126 which requires the operator to move the robot arm to the next point. In the case of the example illustrated in FIG. 4, the next point would be the point labeled M001. At this point, the operator would define the function if any associated with point M001 as required in block 128. In response to an operator command, block 130 stores a set of command signals comprising the absolute coordinate values of the point M001 as well as the programmed function. The process moves to block 131 which tests whether a close path function is required. Since it doesn't, the process returns to block 124.

Moving through process blocks 124 through 131, the operator moves the robot arm to point M002, defines a function and stores the information. This is the point in space from which the branch or wire wrap loop is to start. One limitation of the preferred embodiment is that only a single function may be programmed in association with a set of coordinate values. Since one function has already been defined, a new point must be programmed to define the branch function. This new point M003 is coincident with point M002 and will have the same coordinate values, therefore no additional action is necessary to move through process blocks 124 and 126. Block 128 requires that the branch address OA be defined. As mentioned earlier, the branches are conditional in nature and are only executed in response to a request signal. Therefore, in association with the branch address OA, the operator also programs an address which identifies a particular request signal to be tested to determine whether or not the addressed branch is to be taken. This information is stored as defined by block 130, and the process again returns to block 124.

The operator continues in the above iterative teach cycle to program the remaining mainline points. The branch address OA and corresponding request signal address is programmed in association with the appropriate mainline points, e.g. M005 and $M_n$. After the operator has programmed the last mainline point $M_n$, the next point contains a close path function and an identification of the point, e.g. M002, on which the program is to close to achieve the desired closed loop cycle. The definition of the close path function and the closing point is executed as required by process block 133.

After programming the mainline program, the operator then programs the branch program. To do this, the mainline program is replayed to the point M003, and the first point OA01 of the branch OA is defined to be coincident with the current position M003. The operator iterates the process through blocks 124 through 131 as earlier described to program branch points OA01 through OA04.

After programming the point OA04, a close path function is tested and defined as required by blocks 131 and 133. However, as will be described later, no closing point is identified. Process block 135 tests whether an offset branch exists. If it does as in the present case, process block 137 requires the operator to program the offset code which marks the branch as an offset branch. Since the offset branch closes on different points, no specific point is identified in association with the close path function. The control system detects the absence of a definite close path point and automatically selects the next point in the program from which the branch was entered. In other words, in this example, the branch was entered from the mainline program point M003; and since no point was programmed in association with the close path function, the control will automatically close the path on mainline point M004. This is the only programming necessary to execute the wire wrapping process around all of the pegs.

With the program completely taught, the operator then selects the automatic mode of operation. Decision block 132 detects the selection of the automatic mode and moves to process block 139 which resets the offset indicator. This block accommodates an abnormal situation which may occur if the automatic mode is interrupted during an offset branch. Next, block 134 tests whether the automatic mode should be continued. Continuing in the automatic mode, block 136 fetches the set of command signals for the first data point from memory, i.e., the information associated with the mainline point M001. Block 138 detects an exit from an offset branch. Block 140 determines whether the system is is an offset branch. If it is not, as is the case with the mainline point M001, block 142 causes the control to utilize the absolute coordinate values as stored. Block 144 commands the system to move the robot arm to the programmed point, and block 146 detects when the robot arm has moved to the programmed point. When the point is reached, block 148 detects the existence of a branch function. If a branch function does not exist, block 150 executes whatever other function has been programmed, which would be the case with the point M001.

The process then returns to decision block 134 which causes the operating system to read the next point M002. With this point, the process is the same as that earlier described in blocks 136 through 150. Next point M003 is read. Since it is coincident with point M002, no move is required; and the process moves immediately to block 148. In this case, a branch function is programmed with the point M003, so the process moves to decision block 152 which determines whether or not the branch condition is met. This is determined by testing the state of the addressed request signal to determine whether the branch is to be entered. The state of the request signal is generally determined by conditions existing in the machine or process with which the robot arm is operated. If the request signal is set, the process moves to block 154 to determine whether or not an offset function has been programmed with the branch. If it has not, the branch is entered as defined by block 156; and the process continues in the normal manner.

In the present case, an offset code was defined with the branch and the process in block 158 sets an offset indicator. Next, block 160 calculates and stores the offset values for each of the position axes of motion, i.e. X, Y and Z axes. The offset values are calculated by algebraically subtracting each absolute coordinate value of the first data point in the branch from a corresponding absolute coordinate value of the current position, i.e. M003. In the present case, because the first data point in the branch OA01 is physically identical to the current position M003, the offset values will be zero. After the offset values are calculated, the process enters the branch as defined by block 156 and returns to decision block 134. The process continues through blocks 136, 138 and 140 to read the first point in the branch OA01. Block 140 recognizes that the process is in an offset branch and moves the process to block 162 which causes the offset values to be algebraically added to the programmed coordinate values. In this case, the point OA01 is coincident with the current position M003 and the offset values are zero. Therefore, no physical motion takes place. The process iterates again to read point OA02; however, since the offset value is zero, block 144 and 146 will cause the robot arm to move to the point OA02 as it was originally programmed. The process will iterate through the other branch points, OA03 and OA04 in the same manner.

The next point in storage is the close path point. After reading the close path point, block 138 detects that the robot arm is exiting the offset branch; and therefore block 164 resets the offset indicator. Since no specific close path point was programmed, the control automatically moves to the point subsequent to the point from which the offset branch was entered. In this case, that point is mainline point M004. The robot arm moves to the point M004 and executes the programmed function. As earlier described, point M005 is read, and the offset branch is detected. The offset indicator is set, and new offset values are calculated. In this case, the offset values are no longer zero. When the absolute coordinate values of the first data point OA01 in the offset branch are subtracted from the current absolute coordinate values of a point M005, nonzero offset values will be obtained. This is readily apparent from FIG. 4 when one compares the spatial position of mainline point M005 (the present position) with the physical location of the first point OA01 in the branch. Further, as each point in the branch is read, the offset value will be added to the program coordinate by block 162 to generate a new point in space. Blocks 144 and 146 are operative to move the robot to the new point in space. It should be noted that the absolute coordinate values of the programmed points are never changed in storage. The offset values are calculated as they are needed, and the programmed coordinates are modified prior to being output to the servomechanism. The process continues in the manner above-described for each of the successive mainline points until the wire wrap cycle is completed.

In the preferred embodiment, it was found convenient to define two indicators which are helpful in utilizing the offset function. The first indicator is referred to as the offset indicator and has a value of zero or 1. When the offset indicator is set to one, the offset value are utilized to modify the absolute coordinate values of the next programmed point. When the offset indicator goes to to zero, the offset values are not used. A second indicator is defined as the offset branching status indicator. This indicator is a tristate function. The indicator has one value when the robot is entering an offset branch, a second value when the robot is exiting an offset branch, and a third value in all other situations. These indicators are particularly useful in the unusual situation where the robot changes direction between programmed points in the offset branch.

As will be appreciated by those who are skilled in the art, in the preferred embodiment, the invention is most useful in applications where the coordinate system of the stored data corresponds to the coordinate system of the workpiece. For example, in the robot arm control disclosed herein, the programmed positions are defined in absolute coordinate values relative to a rectangular coordinate system. Therefore, the invention is most readily applied to an application in which the working operation relative to the workpiece may also be readily defined relative to a rectangular coordinate system. Obviously, rectangular coordinate data may be translated by simple addition or subtraction without destroying the integrity of the desired resultant path defined by the locus of programmed points. In contrast, angular coordinate data does not translate linearly, and the resultant path integrity cannot be maintained by adding constant increments to successive coordinate values.

The robot system of FIG. 1 illustrates six degrees of freedom. The actuators 14, 20 and 24 control the positions of the work point 76, and position information for these actuators is stored relative to a rectangular coordinate system. However, the actuators 28, 30 and 32 control the orientation of the end of the robot arm, and position information for these actuators is stored relative to angular coordinates.

In view of the above, in this disclosure, when offset values are calculated, they are only calculated for the rectangular coordinate values defining the position of the work point 76; and the programmed information defining orientation is not offset. Further, although the preferred embodiment utilizes the rectangular coordinate system, there are limited situations where the invention may be practiced with a nonrectangular coordinate system.

Appended to this specification is a printout of an offset program for the above process. The program represents one embodiment for utilizing an offset branch. The program is written in assembly language for use on a CIP/2200 computer utilized in the robot arm control commercially available from Cincinnati Milacron Inc. The program is part of an overall operating system program which controls all the operations of the robot arm. Pages 1 through 4 of the printout contain headnotes which provide a general description of the offset program and the rules for using it. Page 5 contains a routine for recognizing the offset code which is programmed as part of a close path point during the teach mode. Page 6 discloses a routine for marking the branch as an offset branch. The routine on page 7 contains several subroutines for initializing the offset indicators in both the teach and automatic modes and a final subroutine defining the address of the offset values. The routine on pages 9 and 10 is used in the automatic mode after a branch is recognized. The routine tests the offset indicators and calculates and stores the offset values. Page 11 discloses a routine for displaying an offset symbol on the CRT during the teach mode. Page 12 illustrates a routine for modifying the X, Y, and Z coordinate values with the offset values during the automatic mode. Pages 13 and 14 contain routines for adding points to an offset branch as a part of the edit capabilities of the robot control. The routine on page 15 displays an offset symbol on the CRT during the automatic mode, and page 16 contains a routine for determining the state of the offset indicators during the automatic mode.

It should be noted that the routines disclosed on pages 11, 13, 14 and 15 have not been earlier described; however, they merely represent operator convenience routines which are not absolutely necessary to the operation of the claimed invention.

The appended offset program provides explicit information on how the claimed invention may be utilized with the operating system contained in the robot control commercially available from Cincinnati Milacron Inc. Further, the detailed flow charts and coding provide sufficient information for one who is skilled in another programming language compatible with another computer operated robot control to practice the invention.

While the invention has been illustrated in some detail according to the preferred embodiments shown in the accompanying drawings, and while the preferred illustrated embodiments have been described in some detail, there is no intention to thus limit the invention to such detail. On the contrary, it is intended to cover all modifications, alterations, and equivalents falling within the spirit and scope of the appended claims.

```
ENT    OFS                USED BY AUTO TO TEST IF OFFSETTING
ENT    OFSA.1,OFSA.2      CALLED BY ADD02 WHEN ADDING POINTS
ENT    OFSDIS             CALLED BY DISAC2 FOR DIPLAY ROUTINE
ENT    OFFSET             CALLED BY AUTOC2 TO SET THE NEW POINT
ENT    OFSD.1             CALLED TO DISPLAY 'BRANCH*' BY DISP03
ENT    OFSB.1             CALLED BY BRANCH ROUTINES TO SET OFFSET
ENT    CPOB               SET BY RDPT02 WHEN MARKING A BRANCH
ENT    OFS3,MARK          CALLED BY CLPHC2 WHEN CLOSING PATH
ENT    OFS1               CALLED BY TECHO3
ENT    OFS2               CALLED BY CNTP04 , CLEARS ALL INDICATORS
ENT    OFSI.1             FROM INCR02, WHEN REVERSING DIRECTION
ENT    OFSI.2             CALLED BY INCRC2 TO CLEAR OFFSET
ENT    CBSTAT             BRANCHING STATUS
ENT    OFFT               TRACKING COORD OFFSET

EXT    MAINSA,MAINEA          FROM CONSTANTS
EXT    CLPHC1             RETURN FROM CALL FROM CLPHC2
EXT    CONTIN             REENTRY POINT FOR ADDC2
EXT    .TRN99             IN TRNS01 FOR F83 ERROR
EXT    X1,Y1,Z1           IN AUTO02, THE NEW OFFSETTED VALUES!
EXT    FDISA              IN DISP03, POSITION OF * IN 'BRANCH*'
EXT    MAIN
EXT    DD0,DD1            IN AUTO02
BPAGE
```

```
****************************************************************
*                                                              *
*    TITLE  -- OFST01  - OFFSET BRANCHING FUNCTION - VERSION 01 *
*                                                              *
*    AUTHOR CODE  --  03D - 43684  - CONNECTICUT YANKEE          *
*                                                              *
*    DATE  OPERATIONAL  --   01/06/77                           *
*                                                              *
*                                                              *
*    REVISIONS - NOW MOVE TO FIRST POINT OF AN OFFSET BRANCH IS *
*            A NO MOVE SITUATION. PREVIOUSLY, THERE COULD BE AN *
*            ORIENTATION MOVE, BUT NOW THERE WILL BE NO MOVE AT ALL *
*                                                    03/12/77  *
*                                                              *
*    BASIC IDEA -- OFFSET BARNCHING IS A DYNAMIC APPLICATION OF *
*         THE 'MODIFY' FUNCTION IN PRINCIPLE, ALTHOUGH IT DOES NOT *
*         USE ANY OF THE MODIFY OR OFFSET FUNCTION FILES THAT HAVE *
*         ALREADY BEEN WRITTEN. WHEN AN OFFSET BRANCH IS ENTERED *
*         AN OFFSET VALUE FOR THE X,Y,Z COORDINATES IS DEFINED. *
*         THIS OFFSET VALUE IS THEN ADDED TO THE STORED COORDINATES *
*         OF THE PROGRAMMED BRANCH. THIS OFFSET VALUE IS DEFINED *
*         AS                                                   *
*              (CURRENT ROBOT X,Y,Z LOCATION)                  *
*                          -                                   *
*                         (STORED X,Y,Z LOCATION OF FIRST BRANCH *
*                                         DATA POINT)          *
*                                                              *
*         A BRANCH IS MARKED AS AN OFFSET BRANCH IF THE 5TH & 6TH *
*    BYTES OF THE FIRST ADDRESS POINT OF THE BRANCH ARE X'0000' *
*    INSTEAD OF THE USUAL X'FFFF'. A BRANCH IS DESIGNATED BY THE *
*    OPERATOR AS BEING AN OFFSET BRANCH AT CLOSE PATH TIME. THE *
*    OPERATOR HITS 'CLOSE PATH' AND THEN ALPHABETIC 'O' AND THEN *
*    A USUAL CLOSE PATH POINT; SUBROUTINES ARE ALSO ALLOWED.   *
*    THE MESSAGE ON THE CRT FOR THE OPERATOR WILL BE           *
*                         CLOSE PATH                           *
*                         * OFFSET *                           *
*    THE BRANCH MARKED IN THIS WAY WILL REMAIN AS AN OFFSET BRANCH *
*    UNTIL THE ENTIRE BRANCH IS REINITIALIZED.                 *
*                                                              *
*    WHEN A POINT IS DISPLAYED IN THE TEACH MODE THAT HAS A BRANCH *
*    AS THE FUNCTION FOR THAT POINT, IT WILL DESIGNATE AN OFFSET *
*    BRANCH AS 'BRANCH*' INSTEAD OF THE USUAL 'BRANCH'.        *
*                                                              *
*    WHEN THE ROBOT IS PHYSICALLY AT A POINT THAT IS OFFSET FROM THE *
*    LOCATION AT WHICH IT WAS PROGRAMMED, THE ON POINT MESSAGE WILL *
*    APPEAR AS 'ON POINT *OB03' INSTEAD OF THE USUAL 'ON POINT OB03' *
*    THIS WILL GIVE THE OPERATOR SOME INDICATION THAT THE ROBOT IS *
*    IN AN OFFSET BRANCH IN THE AUTO OR TEACH MODE.            *
*                                                              *
*    THE OFFSETTING ACTION OCCURS ONLY WHEN THE OFFSET BRANCH IS *
*    ENTERED FROM THE BEGINNING. IF ANOTHER BRANCH CLOSES PATH INTO *
*    THE MIDDLE OF AN OFFSET BRANCH, THE ROBOT WILL GO TO THE  *
*    ORIGINALLY PROGRAMMED POINTS FOR THAT BRANCH. NOTE THAT THOSE *
```

```
*       ORIGINALLY PROGRAMMED POINTS WERE NEVER ALTERED BY OFSTO1.        *
*                                                                         *
*       THE OFFSETTING ACTION OF THE OFFSET BRANCH IS LOST BY ANY ONE     *
*       OF THREE OCCURRENCES.                                             *
*              1)  THE ROBOT GOES THROUGH ANY CLOSE PATH POINT.           *
*              2)  THE ROBOT BACKS OUT OF ANY BRANCH.                     *
*              3)  THE ROBOT ENTERS ANY NON-OFFSET BRANCH.                *
***************************************************************************

***************************************************************************
*                                                                         *
*       $$$ WARNING $$$      THESE THREE RULES ARE COMPLETE AND SIMPLE;   *
*           HOWEVER, THEY WILL SURELY LEAD TO SURPRISING RESULTS TO       *
*           THE OPERATOR WHO RUNS THROUGH A PROGRAM HAPHAZARDLY.          *
*                                                                         *
*       THE OFFSET IS EITHER SET TO SOME VALUE OR IT IS ZERO. IF THE      *
*       ROBOT ENTERS AN OFFSET BRANCH WHEN IT IS ALREADY IN AN OFFSET     *
*       BRANCH, THEN IT SIMPLY DEFINES A NEW OFFSET VALUE AND THE OLD     *
*       ONE IS LOST.                                                      *
*                                                                         *
*       $$$ FINAL WARNING $$$                                             *
*       KNOW THE THREE RULES FOR LOSING THE OFFSET ACTION BEFORE YOU      *
*       ATTEMPT TO USE THIS FUNCTION. WHEN PLAYING BACK AND FORTH IN      *
*       THE TEACH MODE, SURPRISING RESULTS ARE ALMOST GUARENTEED.         *
*                                                                         *
*       BECAUSE IT IS POSSIBLE TO OFFSET POINTS FARTHER THAN THE ROBOT    *
*       CAN REACH, THE OFFSETTING FUNCTION CAN ISSUE A P83 ERROR WHICH    *
*       IS SIMILAR TO A P81 OR P82. THIS RETURNS THE ROBOT TO THE         *
*       MANUAL MODE. HOWEVER, THIS WILL ONLY CATCH OVERFLOW ERRORS;       *
*       THE ROBOT COULD PHYSICALLY CONSTRAIN ITSELF IN A RELOCATED BRANCH *
*       AND RUN INTO AN EXCESS ERROR SITUATION IF IT HIT THE HARD STOPS. *
*                                                                         *
***************************************************************************

C00C     OFST01   EQU    *
                           ****
                           ****
                           ****    THIS FIRST ROUTINE IS CALLED FROM CLPH02 AND RDPT02      *
                           ****    IT RECOGNISES THAT THE OPERATOR IS TRYING TO DESIGNATE A *
                           ****    BRANCH AS AN OFFSET ONE. RDPT02 SETS CPOB IS AN ALPHABETIC 'O' *
                           ****    IS READ IN INSTEAD OF A REAL POINT DESCRIPTION.          *
                           ****

0000 C00C       OFS3     DC       **
0002 53FF0018            CLI      X'FF',CPOB        TEST IF 'O' WAS ENTERED AFTER CLOSE PATH
                  *                                     WAS HIT
0006 5140000C            BOC      X'40',OFS31       IF IT WAS, THEN CONTINUE, ELSE RETURN
000A 63F4                JMP*     OFS3
                  *
000C 560F0018 OFS31      CMI      X'0F',CPOB        PARTIALLY CLEAR CPOB FLAG
0010 870142              LDX=     A'OFFMES'         DISPLAY '* OFFSET *'
0013 6AA0                RTJ*     .DPLM
0015 660000              JMP/     CLPH01            NOW RETURN TO CLOSE PATH ROUTINE TO READ
                  *                                     POINT DESCRIPTION.
                  *
0018 C00C       CPOB     DC       **                FLAG USED IN ABOVE ROUTINE
                  *
                  *
                           ****
                           ****    THIS ROUTINE IS ALSO CALLED BY CLPH02. WHEN THE CLOSE PATH    *
                           ****    OPERATION IS UNDERWAY, THIS ROUTINE IS CALLED AND IT MARKS THE *
                           ****    BRANCH AS AN OFFSET BRANCH IF THE OPERATOR HAD DESIGNATED IT AS *
                           ****    BEING ONE. IT CAN ALSO ISSUE A P20 - ATTEMPT TO OFFSET MAINLINE*
                           ****

001A C00C       MARK     DC       **
001C E1FA                LDA      CPOB              TEST IF CPOB WAS SET IN EARLIER PART OF
                  *                                     CALL TO CLPH02.
001E 1112                SAZ      MARK5             IF IT WASN'T, THEN JUST LEAVE
                  *
```

```
0020 E03C         LDA   CAN             ELSE MARK THE BRANCH, BUT FIRST TEST TO
      *                                 SEE IF THE IDIOT OPERATOR IS TRYING TO
      *                                 OFFSET THE MAINLINE. DON'T WORRY FOLKS,
      *                                 HE REALLY CAN'T, BUT WE WOULDN'T WANT
      *                                 THE DUMBO TO THINK THAT HE CAN.
0022 1905         NAZ   MARK4
      *
0024 E7B2B0       LDA=  C'20'           P20 - OFFSETTING MAINLINE ATTEMPT
0027 6A9E         RTJ*  .DISE
      *
0029 E044  MARK4  LDA   ZERO            NORMAL FLOW CONTINUES. MARK THE BRANCH.
002B F1EE         STA   CPOB            CLEAR THE CPOB (CLOSE PATH OFFSET BRANCH)
      *                                    INDICATOR.
002D 868C00       LDX/  MAINSA,X        ACTUALLY THIS GETS THE MAIN STARTING
      *                                 ADDRESS OF THE BRANCH TO BE MARKED.
0030 F504         STA+  4               MARK THE 5TH & 6TH BYTES OF THE BRANCH
      *                                 ADDRESS POINT WITH X'0000'.
0032 63E6  MARK5  JMP*  MARK            ALL DONE, RETURN TO CLPH02 OR WHATEVER

****
      ****   HERE ARE A COUPLE OF LITTLE ROUTINES WHICH CLEAR THE OFFSETTING *
      ****   ACTION. THEY HELP TO MAKE SURE THAT THE ROBOT IS NEVER OFFSET   *
      ****   AT A TIME WHEN IT SHOULDN'T BE, LIKE WHEN IT TRIES TO RETURN TO *
      ****   HOME.                                                           *
      ****

0034 000C  OFS1   DC    **              CALLED FROM TECHO3
0036 E044         LDA   ZERO
0038 F1DE         STA   CPOB
003A 63F8         JMP*  OFS1
      *

*
003C C00C  OFS2   DC    **              CALLED BY CNTPC4, CLEARS ALL OFFSET
      *                                                            INDICATORS
003E E044         LDA   ZERO
0040 F1D6         STA   CPOB
0042 F11C         STA   OFS
0044 F60188       STA/  OBSTAT
0047 F119         STA   OFFX
0049 F119         STA   OFFY
004B F119         STA   OFFZ
004D 63ED         JMP*  OFS2
      *

*
004F C00C  OFSI.2 DC    **              CALLED BY INCRC2 WHEN GOING THROUGH CLOSE
      *                                 PATH POINT OR BACKING OUT OFF BRANCH OR
      *                                 ENTERING ANY BRANCH.
0051 E10D         LDA   OFS             IF NOT OFFSETTING, DON'T WORRY
0053 1105         SAZ   SI3
0055 E048         LDA   MONE            SET UP OBSTAT TO INDICATE THAT YOU ARE
0057 F60188       STA/  OBSTAT          LEAVING AN OFFSET BRANCH
     005A   SI3   EQU   *
005A E044         LDA   ZERO            RESET OFS ALWAYS, JUST IN CASE
005C F102         STA   OFS             DON'T CLEAR OFFSET VALUES INCASE YOU REVERS
005E 63EF         JMP*  OFSI.2          THAT'S ALL YOU DO
      *

*
0060 000C  OFS    DC    **              IF OFS=0 ==> NOT OFFSETTING
      *                                 ELSE YOU ARE OFFSETTING
0062 000C  OFFX   DC    **              OFFSET VALUE FOR X AXIS
0064 0000  OFFY   DC    **              OFFSET VALUE FOR Y AXIS
0066 0000  OFFZ   DC    **              OFFSET VALUE FOR Z DIRECTION
```

```
         C05F      OFFT    EQU     OFFX-3          LABEL FOR OFFSET IN TRACKING DIRECTION
                   ****    THIS ROUTINE IS CALLED BY THE BRANCH ROUTINES AND THIS IS THE    *
                   ****    SECTION WHERE THE BIG OFFSET IS ACTUALLY DEFINED.  ONLY THE X,Y,*
                   ****    Z OFFSET VALUES ARE DEFINED.                                     *
                   ****

0068 0000         OFSB.1   DC      **
006A 69D0                  RTJ     OFS2            CLEAR OUT ALL OLD INDICATORS
006C 868C00                LDX/    MAINEA,X        ACTUALLY YOU ARE GETTING THE STARTING
                     *                                ADDRESS OF THE BRANCH HERE.
006F C504                  LDB+    4               TEST IF 5TH & 6TH BYTES ARE X'C000'
0071 49                    INB
0072 1240                  SBZ     NOFF            IF NOT X'C000', THEN SKIP TO END
0074 E50F                  LDA+    15              ALSO SKIP IF EMPTY BRANCH, CAUSE IT'S HARD
                     *                                TO OFFSET THE BRANCH WHEN YOU DON'T KNOW
                     *                                WHERE IT IS.
0076 1431                  SAN     NORML           NOTE THAT IT'S STILL AN OFFSET BRANCH
                     *                             EVEN IF IT'S EMPTY, (IN CASE YOU ADD POINTS
                     *                             TO IT), BUT OFFX,Y,Z = 0
                     *
0078 CB                    RC4                     IF YOU GOT HERE, THEN IT'S TIME TO MAKE
                     *                                THE OFFSET
0079 E000                  LDA     XHO             GET CURRENT ROBOT POSITION AS DEFINED ON
                     *                             BASE PAGE (IN CASE YOU ARE TRACKING)
007B B512                  SBA+    18              NEXT, SUBTRACT THE STORED X COORDINATE FOR
                     *                                THE FIRST DATA POINT OF THE BRANCH THAT
                     *                                YOU ARE ABOUT TO ENTER
007D F1E3                  STA     OFFX            NOW STORE IT AWAY FOR A RAINY DAY
007F E004                  LDA     YHO             DO THE SAME THING FOR THE OTHER TWO AXES
0081 B514                  SBA+    20
0083 F60064                STA/    OFFY
0086 E005                  LDA     ZHO
0088 B516                  SBA+    22
008A F1DA                  STA     OFFZ            WELL, WE'RE ALMOST DONE.
                     *                             IF YOU ARE REPLAYING THROUGH A TRACKING
                     *                             BRANCH IN THE TEACH MODE, THE MBIN
                     *                             INDICATOR IS SET.  THIS MAKES THE
                     *                             COORDINATES GET ADJUSTED BY TRKA.2, BUT THE
                     *                             OFFSET HAS ALREADY ADJUSTED FOR TRACKING.

008C E60000                LDA/    MBIN            SEE IF REPLAY IN TRACKING IS SET
008F 1112                  SAZ     NORML           IF NOT, THEN IT'S HUNKY DORY
                     *                             ELSE IT'S CALCULATION TIME.
0091 E09A                  LDA     THO             TEST WHICH AXIS IS TRACKING
                     *                             THO HAS THE VALUE 0,4 OR 8, DEPENDING ON
                     *                             WHICH AXIS IS TRACKING.
0093 2C01                  ARA     1               EFFECTIVELY DIVIDE BY TWO
0095 4C                    TAX                     USE IT AS AN INDEX
0096 3119                  IBA     C,TRACK         NOW INPUT THE TRACKING POSITION
   PAGE 010   DATE 030278   OFFSET BRANCHING - VERSION C1

0098 2C0F                  RLA     8
009A 31B9                  IBA     5,TRACK         GOT THE POSITION IN A REGISTER
009C 5F1076                MUL     SFC             MULTIPLY BY SCALE FACTOR
009F 2A01                  ALL     1               SET UP TO ADJUST THE OFFSET
00A1 4A                    CCA                     WE ARE SUBTRACTING IT, SO NEGATE IT AND ADD
00A2 48                    INA
00A3 A68C62                ADA/    OFFX,X          MODIFY THE OFFSET FOR TRACKING
00A6 F68C62                STA/    OFFX,X
                     *                             LAST THING TO DO IS TEST FOR OVERFLOW
         0CA9     NORML    EQU     *
00A9 1C0B                  SOV     STOP            CALCULATIONS
00AB 55FF0C60              SMI     X'FF',CFS       IF NO OVERFLOW, THEN SET INDICATOR AND GO
00AF E046                  LDA     CNE             MARK OBSTAT THAT YOU ARE ENTERING A BRANCH
00B1 F601B8                STA/    CBSTAT
00B4 63B7            NOFF  JMP*    OFSB.1
                     *

*                             BUT IF YOU DID OVERFLOW, THEN STOP RIGHT
                     *                             WHERE YOU ARE.  GIVE 'EM A P83 AND JUMP TO
                     *                             THE TRANSFORMATIONS WHERE THE PR1 IS
                     *                             TAKEN CARE OF.
00B6 8092           STOP   LDX     STKPTR          OVERFLOW OCCURRED, YOU WANT A P83, BUT YOU
                     *                             GOTTA SUFFER TO GET IT BECAUSE YOUSE IS IN
                     *                             A FUNCTION AND MUST DO A RETURN.
00B8 E70000                LDA=    A'.TRA99'       GET DESIRED JUMP ADDRESS
00BB F4                    STA-                    PUT IN STACKED P VALUE
```

```
OUBC E78883           LDA=    C'83'           GET PF3 DISPLAY
OUBF F505             STA+    5               STORE IT AWAY
OUC1 5F01             RET                     AND RETURN FOR A P83

****
                ****  THIS NEXT ROUTINE IS USED WHEN YOU ARE IN THE TEACH MODE AND   *
                ****  YOU DISPLAY THE DATA ASSOCIATED WITH A GIVEN POINT. IT PUTS    *
                ****  THAT NICE LITTLE '*' NEXT TO THE WORD 'BRANCH' IF IT'S PROPER. *
                ****

OUC3 0000     OFSD.1  DC      **              CALLED BY DISPC3
OUC5 E240             LDA*    ADDR+2          GET FUNCTION BYTES
OUC7 D701F0           ANA=    X'01F0'         MASK OFF BRANCH FUNCTION NUMBER
OUCA 2C02             ARA     2               EFFECTIVELY MULTIPLY IT BY 4 FOR INDEXING
OUCC 4C               TAX
OUCD 26802E           LDX/    MAINSA,X        GET BRANCH STARTING ADDR.
OUD0 1508             SXN     OFSD.3          SKIP IF BRANCH IS UNPROGRAMMED
OUD2 E504             LDA+    4               GET 5TH & 6TH BYTES TO TEST IF MARKED
                *                             FOR OFFSET
OUD4 1904             NAZ     OFSD.3          IF NOT MARKED, THEN JUST GO ON
OUD6 55AA0000         SMI     X'AA',FDISA     SET UP A C'*' IN DISPLAY
OUDA 63E7     OFSD.3  JMP*    OFSD.1          RETURN
                *
                ****  NOW THIS SECTION IS CALLED BY AUTOU2 AND THIS IS WHERE THAT    *
                ****  PREVIOUSLY DEFINED OFFSET VALUE IS PUT TO GOOD USE. IT'S CALLED*
                ****  BY AUTO WHEN IT MOVES IN THE NEXT POINT TO MOVE TO. NO ACTION  *
                ****  IS DONE IS THE ROBOT IS NOT IN AN OFFSET BRANCH.               *
                ****

OUDC 0000     OFFSET  DC      **
OUDE E180             LDA     OFS             TEST IF IN OFFSET BRANCH
OUE0 1126             SAZ     OFSST2          IF NOT, SKIP DOWN
OUE2 0B               RO4                     ELSE ADD IN THE OFFSET
OUE3 ED03             LDV+    3               X REGISTER HAS ADDR OF NEXT POINT IN CORE
                *                             PICK UP X COORDINATE INFO STORED THERE
OUE5 A60062           ADA/    OFFX            ADD IN OFFSET
OUE8 F60000           STA/    X1              STORE IN AUTO ROUTINE AS THE NEW PLACE TO
                *                             GO.
OUEB 2F               TBA                     NOW DO THE SAME FOR Y,Z INFO
OUEC A60064           ADA/    OFFY
OUEF F60000           STA/    Y1
OUF2 E507             LDA+    7
OUF4 A60066           ADA/    OFFZ
OUF7 F60000           STA/    Z1
OUFA 100E             SCV     STOPP           TEST FOR OVERFLOW CONDITION.
                *                             IF OVERFLOW OCCURRED, GIVE P83 AND STOP
OUFC E60188           LDA/    OBSTAT          TEST IF JUST ENTERING TO FIRST POINT OF BR
OUFF 23               DCA
0100 1906             NAZ     OFSST2          IF OBSTAT=1, THEN SKIP THIS
0102 5C05C000         MVL     DDO(6),DD1          MOVE CURRENT ORIENTATION COORDS TO
0106 0000
                *                             AUTO AS NEXT POINT TO GO TO
0108 63D2     OFSST2  JMP*    OFSSET          ELSE JUST KEEP ON GOING
                *
     010A     STOPP   EQU     *
010A E78883           LDA=    C'83'           HERE THE P83 IS EASY TO DO
010D 660089           JMP/    .TRN99          AWAY YOU GO, BACK TO MANUAL MODE

****  THIS ROUTINE IS CALLED BY ADD02 AND MAKES SURE THAT THE CORRECT *
                ****  COORDINATE IS PUT IN WHEN NEW POINTS ARE ADDED TO AN OFFSET     *
                ****  BRANCH, IN A SIMILAR WAY TO HOW TRACKING DOES IT NOW.           *
                ****
0110 0000     OFSA.2  DC      **
0112 E60060           LDA/    OFS             TEST IF IN OFFSET BRANCH
0115 191C             NAZ     OFS4.1          IF NOT, THEN FALL OUT OF THIS ROUTINE
0117 E60188           LDA/    OBSTAT          TEST IF YOU ARE JUST INSIDE THE BOUNDRY OF
011A 1902             NAZ     OFS3.1          AN OFFSET BRANCH
011C 63F2             JMP*    OFSA.2
                *
011E 55FF0060 OFS3.1  SMI     X'FF',CFS       IF OBSTAT IS SET AND YOU ARE ADDING A NEW
                *                             POINT, THEN RESET OBSTAT AND SET OFS
0122 E044             LDA     ZERO
0124 F60188           STA/    OBSTAT
                *
```

```
0127 C9       OFS4.1 RC2
0128 E000            LDA    XHO              TAKE CURRENT ROBOT POSITION
012A B60C62           SBA/   OFFX             SUBTRACT THE OFFSET THAT WAS ADDED TO GET
         *                                    IT TO THERE INSIDE THE OFFSET BRANCH
012D F238            STA*   BYTE             STORE THAT IN CORE.
012F 46              AWX
0130 E004            LDA    YHO              DO THE SAME FOR Y,Z AXES
0132 B60C64          SBA/   OFFY
0135 F238            STA*   BYTE
0137 46              AWX
0138 E008            LDA    ZHO
013A B60C66          SBA/   OFFZ
013D F238            STA*   BYTE
013F 660C00          JMP/   CONTIN           JUMP BACK INTO ADDC2
         *

*
0142 CFOCC3  OFFMES DC     X'OFCOC3'        OFFSET MESSAGE FOR CLOSE PATH
0145 AAAUCFC6        DC     C'* OFFSET *'
014F FF              DC     X'FF'
         *
         ****
         ****   OFSA.1 IS CALLED BY ADDO2 WHEN ADDING POINTS.  IT CAN HAPPEN
         ****   THAT ADDING A NEW POINT IN AN OFFSET BRANCH WOULD CAUSE AN
         ****   OVERFLOW WHEN THE COORDINATE IS COMPENSATED FOR OFFSETTING.
         ****   THIS ROUTINE IS CALLED EARLY IN ADDO2 AND STOPS THE POINT FROM
         ****   BEING ADDED BEFORE THE DATA GETS SHIFTED.  THE OVERFLOW
         ****   CONDITION GIVES A P84
         ****

0150 000C   OFSA.1 DC     **
0152 CB            RC4
0153 E000          LDA    XHO              TEST COORDINATES ON BASE PAGE
0155 B60C62        SBA/   OFFX             DO THE SAME THING THAT OFSA.2 WILL DO
0158 E004          LDA    YHO              BUT DO IT WHILE IT'S STILL EARLY ENOUGH
         *                                  TO BACK OUT OF ADDING THE POINT.
015A B60C64        SBA/   OFFY
015D E008          LDA    ZHO
015F B60066        SBA/   OFFZ
0162 1805          NOV    OFSA4            OVERFLOW ==> CAN'T ADD POINT, ELSE OKAY
         *
0164 E7B8B4        LDA=   C'84'            ATTEMPT TO PROGRAM POINT THAT WOULD OVERFLO
         *                                  STORED COORDINATES IN OFFSET BRANCH.
0167 6A9E         RTJ*    .DISE
         *
0169 63E5   OFSA4  JMP*   OFSA.1           RETURN IF NO OVERFLOW
         *

****
         ****   THIS ROUTINE IS CALLED BY DISAC2 AFTER IT PUTS UP THE          *
         ****   'ON POINT' MESSAGE.  THIS PUTS UP A '*' IF THE ROBOT IS IN AN  *
         ****   OFFSET BRANCH OR A ' ' IF THE ROBOT IS NOT.                    *
         ****

016B C000   OFSDIS DC     **               OFFSET DISPLAY
016D E60C6C        LDA/   OFS
0170 D7AAC0        ANA=   X'AAC0'          MASK OF C'*' FROM OFS FLAG
0173 C7ACFF        LDB=   X'ACFF'          MAKE SURE THAT YOU AT LEAST OUTPUT A ' '
0176 40            CRA
0177 F10A          STA    STAR+3           PUT IN DISPLAY DATA
0179 870180        LDX=   A'STAR'
017C 6AAU          RTJ*   .DPLM            DISPLAY THE STUFF
017E 63EB          JMP*   OFSDIS
         *

0180 0F1B00  STAR  DC     X'0F1BC0'        POSITION CRT
0183 ACFF          DC     X'ACFF'          ' ' OR '*'
         *
         *                                  THAT'S ALL FOLKS
```

```
****
****    OFSI.1 IS CALLED BY INCR02 WHEN YOU ARE REVERSING DIRECTIONS.
****    IF YOU ARE JUST ENTERING OR LEAVING A BRANCH, THEN YOU MUST
****    ADJUST WHETHER OR NOT YOU SHOULD PERFORM OFFSETTING ACTION.
****

0185 0000       OFSI.1   DC    **
     0188       OBSTAT   EQU   *+1
0187 E70000              LDA=  X'0000'      THIS INDICATOR IS JUST LIKE TRSTAT FOR
         *                                  TRACKING. IT IS USED WHEN YOU ARE JUST
         *                                  ENTERING OR LEAVING AN OFFSET BRANCH.
         *                                  IT IS SET IN INCR02 AND IN ABORT SITUATIONS
         *                                  AND IS CLEARED BY OFSDIS WHEN THE ROBOT
         *                                  GETS ON POINT.
018A 1108                SAZ   .OFI2        IF OBSTAT IS NOT SET, THEN SKIP OUT
         *
018C 4A                  CCA                ELSE NEGATE OBSTAT AND REVERSE OFFSET
018D 48                  INA                BRANCHING STATUS, BUT DON'T ZERO THE OFFSET
018E F1F8                STA   OBSTAT       VALUES.
0190 57FF0060            IMI   X'FF',CFS    REVERSE OFFSET STATUS
0194 63EF       .OFI2    JMP*  OFSI.1
         *
                         END

ERROR FLAGS   000
```

What is claimed is:

1. A method for controlling a robot arm in response to sets of command signals stored in a memory, each set of command signals representing a programmed function and absolute coordinate values of a programmed position of the robot arm, said sets of command signals being divided into a first program represented by first sets of command signals and defining a basic cycle of operation of the robot arm and at least one second program represented by second sets of command signals and defining a conditional operation of the robot arm in response to a request signal, said sets of command signals being defined during a teaching mode of operation and being utilized during an automatic mode of operation, the method comprising the steps of:

(a) identifying during the teaching mode of operation one of the second programs as an offset program;

(b) recalling from the memory during the automatic mode of operation the first sets of command signals;

(c) moving the robot arm to the programmed positions defined by the absolute coordinate values of the first sets of command signals;

(d) detecting in response to the robot arm being moved to each programmed position a request for the offset program;

(e) determining offset values in response to the request for the offset program, each offset value representing the algebraic difference between one of the absolute coordinate values of the current programmed position of the robot arm and a corresponding absolute coordinate value of a programmed position in the offset program;

(f) producing new second sets of command signals by modifying the absolute coordinate values of each of the second sets of command signals in the offset program as a function of the offset values; and (g) moving the robot arm to spatial positions defined by the new second sets of command signals.

2. A method for controlling a robot arm operated by a control in response to sets of command signals stored in a memory, each set of command signals representing a programmed function and absolute coordinate values relative to a first coordinate system of a programmed position of the robot arm, said sets of command signals being divided into a first program represented by first sets of command signals and defining a basic cycle of operation of the robot arm and at least one second program represented by second sets of command signals and defining a conditional operation of the robot arm in response to a request signal, said sets of command signals being defined during a teaching mode of operation and being utilized during an automatic mode of operation, the method comprising the steps of:

(a) identifying during the teaching mode of operation one of the second programs as an offset program;

(b) recalling from the memory during the automatic mode of operation a first set of command signals;

(c) moving the robot arm to the programmed position defined by the absolute coordinate values of the first set of command signals;

(d) testing the first set of command signals for a request for the offset program;

(e) producing in response to a request for the offset program, offset signals as a function of a programmed position defined by the offset program and the position of the robot arm defined by the first set of command signals;

(f) producing a new second set of command signals by modifying a second set of command signals in the offset program as a function of the offset signals;

(g) moving the robot arm to the spatial position defined by the new second set of command signals;

(h) iterating steps (f) and (g) for each second set of command signals contained within the offset program; and (i) iterating steps (b) through (h) for each first set of command signals.

3. The method according to claim 2 wherein the step of identifying one of the second programs as an offset program further comprises the steps of:
(a) storing in association with one of the first sets of command signals an address signal identifying one of the second programs; and
(b) storing in association with the one of the second programs an offset signal marking the one of the second programs as the offset program.

4. The method of claim 3 wherein the method comprises the further step of storing in association with another of the first sets of commands the address signal identifying the one of the second programs.

5. The method of claim 4 wherein the step of testing the first set of command signals further comprises the steps of:
(a) testing the first set of command signals for the presence of the address signal identifying the one of the second programs;
(b) in response to the presence of the address signal, testing for the occurrence of the request signal representing a request for the operation of the one of the second programs; and
(c) in response to the occurrence of the request signal, testing the one of the second programs for the presence of the offset signal to identify the requested one of the second programs as the offset program.

6. The method of claim 5 wherein the step of producing the offset signals further comprises the steps of:
(a) recalling from the memory one of the second sets of command signals defining the absolute coordinate values of the first programmed position of the offset program;
(b) recalling from the memory the absolute coordinate values of the first set of command signals requesting the offset program and representing the current position of the robot arm;
(c) algebraically subtracting each of the absolute coordinate values of the first programmed position of the offset program from a corresponding absolute coordinate value of the current position of the robot arm to produce the offset signals; and (d) storing the offset signals, each offset signal representing the relative change in one of the coordinates to achieve the desired position offset.

7. The method of claim 6 wherein the step of modifying a second set of command signals further comprises the steps of:
(a) recalling from the memory the second set of command signals defining the absolute coordinate values of a programmed position of the offset program;
(b) recalling from the memory the offset signals; and
(c) algebraically adding each of the absolute coordinate values of the offset program to value represented by a corresponding offset signal to produce the new second set of command signals.

8. A method for controlling the position of a robot arm operated by a control in response to sets of command signals stored in a memory, each set of command signals representing a programmed function and absolute coordinate values relative to a rectangular coordinate system of a programmed position of a robot arm, said sets of command signals being divided into a first program represented by first sets of command signals defining a basic cycle of operation of the robot arm and at least one second program represented by second sets of command signals defining a conditional operation of the robot arm in response to a request signal, said sets of command signals being defined during a teaching mode of operation and being utilized during an automatic mode of operation, the method comprising the steps of:
(a) generating and storing during the teaching mode of operation first sets of command signals representing the first program;
(b) generating during the teaching mode of operation an address signal identifying one of the second programs;
(c) storing the address signal in association with at least two of the first sets of command signals;
(d) generating and storing during the teaching mode of operation second sets of command signals representing the one of the second programs;
(e) generating and storing during the teaching mode of operation an offset signal in association with the one of the second programs to identify the one of the second programs as an offset program;
(f) recalling from the memory during the automatic mode of operation one of the first sets of command signals;
(g) moving the robot arm to the programmed position defined by the one of the first sets of command signals;
(h) testing the one of the first sets of command signals for the presence of the address signal;
(i) testing the presence of the request signal in response to the address signal;
(j) testing in response to the request signal the one of the second programs for the presence of the offset signals;
(k) recalling from the memory one of the second sets of command signals associated with the one of the second programs;
(l) determining in response to the offset signal offset values by algebraically subtracting each absolute rectangular coordinate value associated with the one of the second sets of command signals from a corresponding absolute rectangular coordinate value of the current programmed position of the robot arm;
(m) producing, in response to the offset values and the one of the second sets of command signals, a new second set of command signals being defined by a new absolute rectangular coordinate values and representing a new position of the robot arm, each new absolute rectangular coordinate value being equal to the algebraic sum of one of the offset values plus a corresponding absolute rectangular coordinate value associated with the one of the second sets of command signals;
(n) moving the robot arm to the new position defined by the new second set of command signals;
(o) iterating steps (j), (l) and (m) for each second set of command signals contained in the one of the second programs; and
(p) iterating steps (f) through (n) for each of the first sets of command signals thereby causing the one of the second programs to be executed at different spatial locations in response to each occurrence of the address signal.

* * * * *